April 27, 1948.  J. E. GALL  2,440,260
CATHODE RAY TUBE MOUNT
Filed July 14, 1945
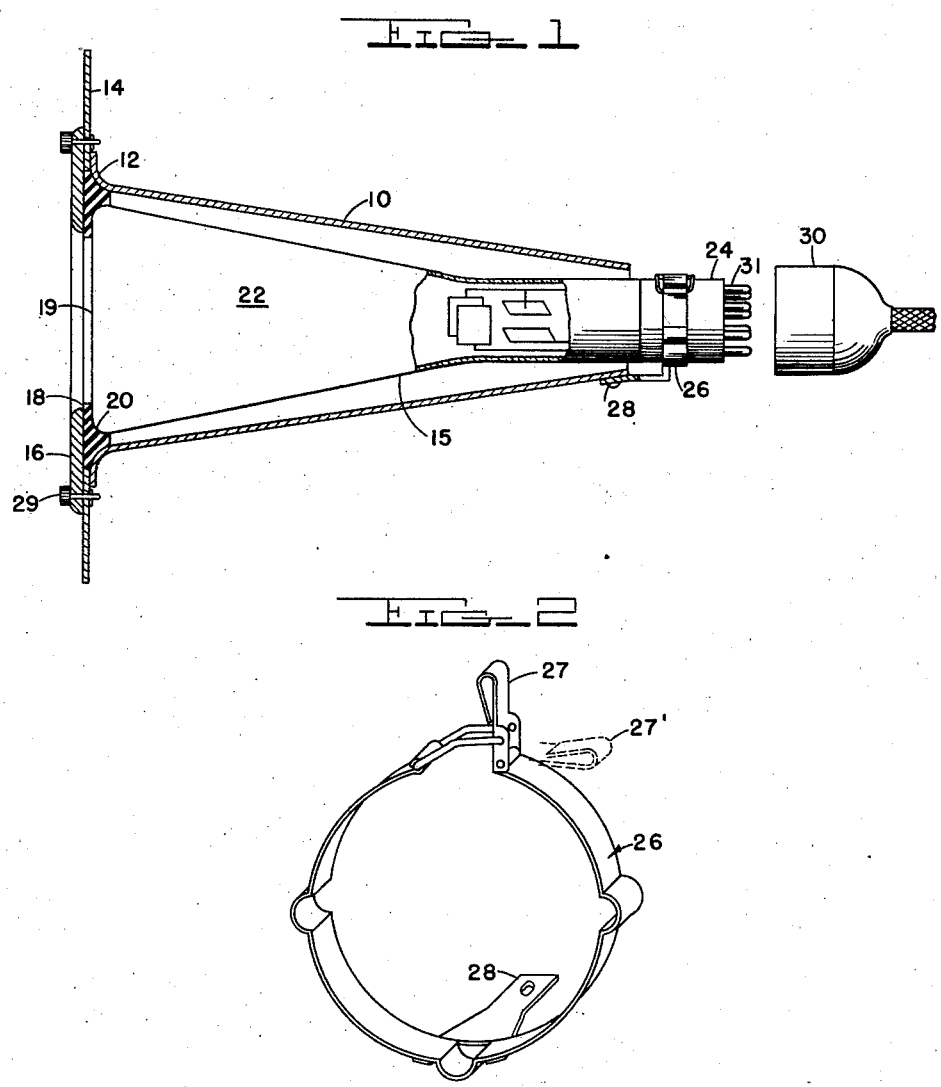
Inventor
JAMES E. GALL
By Ralph L Chappell
Attorney Patented Apr. 27, 1948

2,440,260

UNITED STATES PATENT OFFICE 2,440,260

CATHODE-RAY TUBE MOUNT

James E. Gall, Washington, D. C.

Application July 14, 1945, Serial No. 605,160

5 Claims. (Cl. 250—141)

(Granted under the act of March 3, 1883, as amended April 30, 1928; 370 O. G. 757)

This invention relates to an improvement in cathode-ray tube mounts and more particularly to a mount for such tubes as are characterized by an elongated neck and a bulbous or flask-shaped end enlargement containing an electron-responsive screen.

As is well known, the installation or removal of the cathode-ray tubes used in oscilloscopes or other electronic equipment often may be a difficult undertaking especially if the tube socket is rigidly mounted in a non-yielding support or if the removal of the tube from the tube base connector requires the application of a heavy force to the glass envelope of the tube to free the tube from its socket with possible danger of injury or breakage of the tube structure. The wide application of such tubes in commercial and military electronic equipment makes it desirable to have an improved type of mount which will obviate the difficulties abovementioned.

It is therefore an object of the present invention to provide a mount for a cathode-ray tube or the like which will expedite and readily facilitate the installation and removal of such tubes from the apparatus with which they are associated.

Another object of the invention is to provide an improved mount of the above class the arrangement of which will support the tube during use both at its screen and base end portions, thereby reducing the danger of breakage in service or during replacement.

A better understanding of the invention together with its objects, features and advantages will be had from the particular description of a preferred embodiment thereof made with reference to the accompanying drawing, in which, Fig. 1 is a view of a cathode ray tube installed in one embodiment of the improved mount of this invention; and Fig. 2 is a detailed view of the clamp element used for gripping and holding the base of the tube when in its normal operating position.

In Fig. 1 there is shown a hollow metallic shield 10 open at both ends and having at one end an annular flange 12 which is suitably attached to and supported by the front panel 14 of the apparatus. The shield 10 may be of a generally frusto-conical shape, namely that of a truncated cone as shown in this figure, or it may be shaped to simulate substantially the general contour of the longitudinal sides of the glass envelope 15 of the particular elongated tube 22 which it is intended to encompass or enclose, such as a cathode-ray tube or an iconoscope type tube. A bezel 16 is provided which contacts on its inner face an apertured or windowed resilient cushioning element 18 in abutting engagement with the screen end 19 of the tube 22 and forms one of the two support members utilized to retain the tube in its aligned position within the interior of the shield 10. Element 18 may be formed of flexible vulcanized rubber, neoprene or other synthetic rubbers, and suitably shaped or molded to provide a recessed surface of a character to accommodate the curved rim or peripheral edge 20 of enlarged end portion of the tube 22 and thus seat it uniformly and hold the tube substantially centered with respect to the axis of the shield member 10. Thus the element 18 is held by its normal inherent resilient action in firm contact against the forward rim portion 20 of the tube envelope 15.

Tube 22 is inserted or removed endwise of the shield 10 which, however, is of appreciably shorter length than the overall length of the tube 22. Hence the base 24 thereof will project through and beyond the small end of the shield but not sufficiently to expose the glass envelope and thus be in a position to be grippingly held by the clamp 26 of the present invention. After the element 18 and the bezel 16 associated therewith have been affixed to the panel, it is found that a small longitudinal force directed toward the screen end 19 of the tube 22 and applied at the base 24 thereof will be sufficient to push the rim 20 into seating engagement with the juxtaposed element 18 with the rim seated in the molded concaved recess provided for this purpose in the element 18.

In Fig. 2 there is shown the other support for the tube 10 which comprises a contractile spring clamp 26 which is designed to be clamped about the base 24 of the cathode-ray or other tube 22. As illustrated the clamp 26 is in the shape of a split circular band formed of sheet metal. The toggle-link 27 which connects the split or separated ends of the band is shown in an intermediate position which it passes through in the course of closing or opening the clamp to grip or to release the base 24, as the case may be, from its clamping pressure. Movement of the link 27 to the right into the dotted line position 27' will close the clamp 26; while movement to the left will open it. The clamp 26 may be mounted directly on the shield 10 as shown in Fig. 1 for which purpose the anchoring member 28 carried by the clamp is provided.

Tightening the toggle-operated spring clamp 26 causes the substantially cylindrical tube base 24 to be firmly gripped and immovably held at some point along its length. The exact point of contact between the clamp and the base will depend upon the length of the tube envelope 15. Since the tube base 24 is rigidly and immovably held by the clamp 26, the moveable electrical connector plug 30 can be coupled to the terminal prongs 31 by an endwise or axial push the force and shock of which will be borne wholly by the clamp 26. Thus, the installation of the tube is completed without the application of great forces and strains on the glass parts of the tube structure.

The procedure for the removal of the tube 22 is similarly rapid and easy. As a first step, the connector plug 30 is grasped and pulled endwise to detach it from the base 24 while the latter is still tightly gripped and held by the clamp 26. In that way the forces involved in removing the tube from its socket are not directly applied to the glass envelope. Following the removal of the plug 30, the next steps are to release the toggle link 27 of the expansible clamp 26 after which the tube 22 is pushed back slightly, allowing the lower edge of the forward peripheral rim 20 to rest on the lower part of shield 10. The bezel 16 and the cushioning element 18 are then removed as by loosening of the fastening devices 29 after which the tube may be pushed bodily out of the shield and withdrawn through the wide opening in the front panel 14 previously occupied by part of the cushioning element 18.

It will be apparent from the foregoing discussion that there has been described a cathode-ray tube mount of improved construction providing a two-point suspension of the electronic tube which simplifies and facilitates the installation and removal of elongated electronic tubes of the type having an electron responsive screen at one end and a substantially cylindrical base at the other.

The shield 10 may be supported by brackets from the chassis, if desired, rather than by the flange 12 as described above. Likewise, other means of mounting the clamp 26 are available. For example, it too may be mounted on a bracket fastened to the chassis provided only that it is arranged substantially concentrically with respect to the small end of the tube shield and in fixed spaced relationship thereto.

While there has been described a preferred embodiment of the invention, it will be obvious to those skilled in the art that various changes and modifications may be made therein without departing from the spirit of the invention, and it is therefore, to be distinctly understood that no limitations are intended other than are imposed by the scope of the appended claims, and limited by the prior art.

The invention described herein may be manufactured and used by or for the Government of the United States of America for governmental purposes, without the payment of any royalty thereon or therefor.

What is claimed is:

1. A cathode-ray tube mount comprising a hollow metallic shield having open ends and adapted to accommodate and encompass the sides of a cathode-ray tube, support means supporting said shield independently of the tube, means including a resilient abutting member arranged to engage and support the screen end of said cathode-ray tube in a desired operating position, contractile clamp means for engaging and firmly gripping the base member of said cathode-ray tube in the closed position of said clamp means, and support means for said contractile clamp means fixed in relation to said shield.

2. A mount for a cathode-ray tube comprising a hollow metallic shield of substantially frusto-conical shape, support means secured to the enlarged end of said shield independently of the tube for supporting said shield, means presenting a resilient element in abutting relationship with the screen-end portion of a cathode-ray tube, and constituting one support for said tube, releasable clamping means fixed in relation to said shield and of a contractile structure to be clamped about the sides of the tube base of a cathode ray tube to secure said tube in place during use, and a demountable connector including a socket for said cathode ray tube for establishing electrical operating connections to said tube after the latter is securely clamped in its operating position with respect to said shield.

3. A mount for a cathode-ray tube comprising a hollow metallic shield having frusto-conical sides shaped to enclose a cathode-ray tube and open at both ends, support means for said shield, a bezel, an apertured cushioning element of rubber-like material arranged to be pressed thereby into firm contact with and between the forward rim portion of the glass envelope of the said tube and the said shield, a contractile spring clamp so constructed and arranged that when in its contracted form it will encompass and tightly grip the sides of the tube base of a cathode ray tube to hold the latter immovable, said clamp being disposed substantially concentrically with and supported solely by the shield in fixed axially spaced relationship with respect to the small end of the tube shield, and demountable connector means for connecting the terminals of said tube to an external electrical circuit.

4. A cathode-ray tube mount comprising a hollow metallic shield of frusto-conical shape open at both ends, support means secured to said shield at its larger end opening, a bezel, a resilient cushioning element in cooperative relation with said bezel and the screen end of a cathode-ray tube for retaining said tube substantially centered with respect to said shield, toggle-actuated contractile clamping means arranged to engage the generally cylindrical base portion of a cathode ray tube when said clamp is positioned about said tube, and means fixedly securing said clamp to said shield in axially-spaced relationship with respect to the smaller end opening of said shield.

5. A mount for an elongated electronic tube of the type having an electron responsive screen within an enlarged envelope portion and a substantially cylindrical base portion provided with prong connectors comprising, a hollow metallic shield open at both ends and adapted to encompass and enclose the envelope portion of said tube, support means for said shield, means including a resilient abutting member shaped to receive and seat the enlarged screen end of said tube, a toggle-operated contractile clamp device to be clamped about the substantially cylindrical base of said tube and to firmly hold the tube immovable when said clamp is in a contracted position, means securing said clamp to said shield, and a removable connector including a socket for said tube operatively arranged for attachment to the prongs of said tube for establishing electrical connections between said tube and its external operating circuits.

JAMES E. GALL.

REFERENCES CITED

The following references are of record in the file of this patent:

UNITED STATES PATENTS

| Number | Name | Date |
|---|---|---|
| 2,165,779 | Blain | July 11, 1939 |
| 2,354,661 | Berejkoff | Aug. 1, 1944 |

FOREIGN PATENTS

| Number | Country | Date |
|---|---|---|
| 459,355 | Great Britain | Jan. 6, 1937 |
| 461,450 | Great Britain | Feb. 17, 1937 |